United States Patent
Sueki

(10) Patent No.: US 10,401,817 B2
(45) Date of Patent: Sep. 3, 2019

(54) CONTROL DEVICE AND CONTROL METHOD

(71) Applicant: YOKOGAWA ELECTRIC CORPORATION, Tokyo (JP)

(72) Inventor: Masanori Sueki, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 257 days.

(21) Appl. No.: 15/252,526

(22) Filed: Aug. 31, 2016

(65) Prior Publication Data
US 2017/0083036 A1 Mar. 23, 2017

(30) Foreign Application Priority Data
Sep. 18, 2015 (JP) .................. 2015-185017

(51) Int. Cl.
| | |
|---|---|
| G05B 19/048 | (2006.01) |
| G05B 23/02 | (2006.01) |
| G08B 21/00 | (2006.01) |
| G05B 15/00 | (2006.01) |
| G08B 21/02 | (2006.01) |
| G05B 15/02 | (2006.01) |
| G08B 25/00 | (2006.01) |
| G05B 19/042 | (2006.01) |
| G05F 1/66 | (2006.01) |

(52) U.S. Cl.
CPC .......... *G05B 19/048* (2013.01); *G05B 15/00* (2013.01); *G05B 15/02* (2013.01); *G05B 19/0425* (2013.01); *G05B 23/027* (2013.01); *G05F 1/66* (2013.01); *G08B 21/00* (2013.01); *G08B 21/0216* (2013.01); *G08B 25/00* (2013.01); *G05B 2219/14005* (2013.01); *G05B 2219/14116* (2013.01)

(58) Field of Classification Search
None
See application file for complete search history.

(56) References Cited

U.S. PATENT DOCUMENTS

| | | |
|---|---|---|
| 4,873,431 A | 10/1989 | Ito |
| 5,432,945 A | 7/1995 | Pergent et al. |
| 6,023,399 A | 2/2000 | Kogure |
| 8,354,935 B2 | 1/2013 | Rauworth |

(Continued)

FOREIGN PATENT DOCUMENTS

| | | |
|---|---|---|
| CN | 204212958 U | 3/2015 |
| DE | 10 2011 087 063 A1 | 9/2012 |

(Continued)

OTHER PUBLICATIONS

Gigan et al., "Sensor Abstraction Layer: a unique software interface to effectively manage sensor networks", 2007, IEEE, pp. 479-484. (Year: 2007).*

*Primary Examiner* — Qing Yuan Wu

(74) *Attorney, Agent, or Firm* — Sughrue Mion, PLLC

(57) ABSTRACT

A control device includes an interface module configured to supply electric power to a field device installed in a plant, an application executer configured to output a reset signal for resetting the field device, and a converter configured to convert the reset signal, which has been output from the application executer, into a format which is suitable for the interface module.

17 Claims, 6 Drawing Sheets

(56) References Cited

U.S. PATENT DOCUMENTS

| | | | |
|---|---|---|---|
| 2003/0235211 A1* | 12/2003 | Thiru | ............... H04L 29/06 370/469 |
| 2007/0011365 A1 | 1/2007 | Jurisch et al. | |
| 2013/0027237 A1 | 1/2013 | Washiro | |
| 2013/0253671 A1 | 9/2013 | Torigoe | |
| 2016/0261972 A1 | 9/2016 | Ozoe | |

FOREIGN PATENT DOCUMENTS

| | | |
|---|---|---|
| JP | H08-95624 A | 4/1996 |
| JP | 2006270376 A | 10/2006 |
| JP | 2009229160 A | 10/2009 |
| JP | 201329978 A | 2/2013 |
| JP | 2013-200669 A | 10/2013 |
| JP | 2015-082303 A | 4/2015 |

\* cited by examiner

CONTROL DEVICE AND CONTROL METHOD

BACKGROUND

Technical Fields

The disclosure relates to a control device and a control method.

Priority is claimed on Japanese Patent Application No. 2015-185017, filed Sep. 18, 2015, the contents of which are incorporated herein by reference.

Related Art

In a plant and a factory (hereinafter, called simply "plant" as a generic name of them), a process control system is established, and an advanced automatic operation is implemented. The process control system controls various types of state quantity (for example, pressure, temperature, flow quantity) in an industrial process. In order to secure safety and perform an advanced control, the process control system is equipped with a control system such as a distributed control system (DCS) and a safety system such as a safety instrumented system (SIS).

In the distributed control system, field devices (for example, a measurement device and a manipulation device) and a control device controlling the field devices are connected to each other through communication means. In the distributed control system, the control device collects measurement data measured by the field devices, and the control device operates (controls) the field devices in accordance with the collected measurement data, in order to control various types of state quantity. In an emergency, the safety instrumented system stops the plant certainly in a safe state. Thereby, physical injury and environmental pollution are prevented beforehand, and expensive facilities are protected.

In the conventional safety instrumented system, field devices which detect gas, flame, heat, smoke are prepared, and an alarm is output in accordance with a detection result of the field device. For example, a fire detecting system which is equipped with a carbon monoxide detector is disclosed in U.S. Pat. No. 8,354,935. If a level of the carbon monoxide measured by the carbon monoxide detector exceeds a threshold value, an alarm is output to an alarm panel.

High reliance and stable operation are required for the distributed control system and the safety instrumented system in order to secure safety of the plant. Therefore, high reliability and high maintainability are required for a program (application logic) which runs on the control device. For this reason, it is not preferable that proven application logic is changed greatly. In some industries or companies, a rule (policy) of programming is often made formally or implicitly.

On the other hand, with respect to hardware such as an interface module and a field device, new parts are adopted in accordance with technical progress, parts are discontinued, and parts are changed in accordance with cost reduction demands, in many cases. For this reason, in the conventional control device, it is necessary that the application logic is changed greatly in accordance with a change of hardware. Otherwise, it is necessary that a part of an improvement effect by the change of the hardware is given up, and a change range of the application logic is reduced.

SUMMARY

A control device may include an interface module configured to supply electric power to a field device installed in a plant, an application executer configured to output a reset signal for resetting the field device, and a converter configured to convert the reset signal, which has been output from the application executer, into a format which is suitable for the interface module.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a control device and a control method which can achieve an improvement effect by a change of hardware without changing application logic greatly.

Hereinafter, a control device and a control method of embodiments will be described with reference to drawings.

Figure 1:
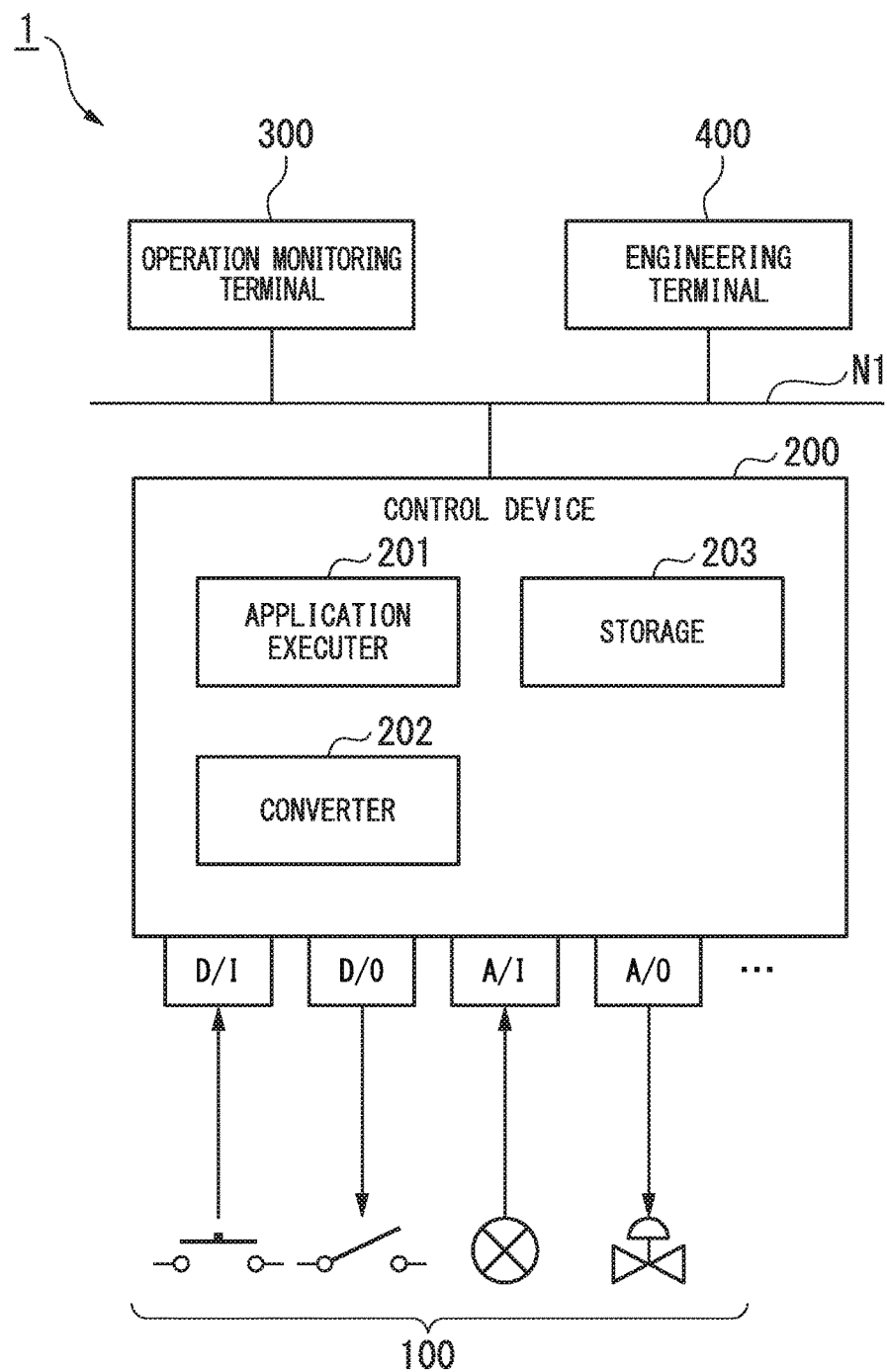
FIG. 1 is a block diagram illustrating a whole configuration of a process control system 1.

FIG. 1 is a block diagram illustrating a whole configuration of a process control system 1. As shown in FIG. 1, the process control system 1 is equipped with a field device 100, a control device 200, an operation monitoring terminal 300, and an engineering terminal 400. The process control system 1 is established in a plant.

The plant includes an industrial plant such as a chemical industrial plant, a plant managing and controlling a wellhead (for example, a gas field and an oil field), a plant managing and controlling a generation of electric power (for example, water power, fire power, and nuclear power), a plant managing and controlling a power harvesting (for example, solar power and wind power), a plant managing and controlling water supply and sewerage systems, a dam, and so on.

The field device 100 is such as a sensor device (for example, a flowmeter and a temperature sensor), a valve device (for example, a flow control valve and an on-off valve), an actuator device (for example, a fan and a motor), and other devices installed in the plant. The field device 100 is connected to the control device 200.

The control device 200, the operation monitoring terminal 300, and the engineering terminal 400 are connected to the intranet N1. The intranet N1 is a network such as Ethernet (registered trademark). For example, the operation monitoring terminal 300 is a device which is operated by a plant operator, and is used for monitoring process. The engineering terminal 400 is a device for creating a program which is to be executed by the control device 200.

The control device 200 is equipped with an application executer 201, a converter 202, and storage 203. The storage 203 stores a program (application logic) executed by the application executer 201. The application logic is created by the engineering terminal 400. For example, the application logic is described in a function block diagram (FBD: Function block Diagram) format by using a graphical user interface. The control device 200 downloads, as a program, the application logic created by the engineering terminal 400 into the storage 203.

The application executer 201 executes the downloaded program, and collects data of measurement value (process value) from the field device 100. The application executer 201 calculates an operation amount based on the collected data, transmits a driving signal to another field device, and controls a process. Although details will be described later, the converter 202 converts the signal, which has been output from the application executer 201, into a format which is suitable for an interface module.

Figure 2:
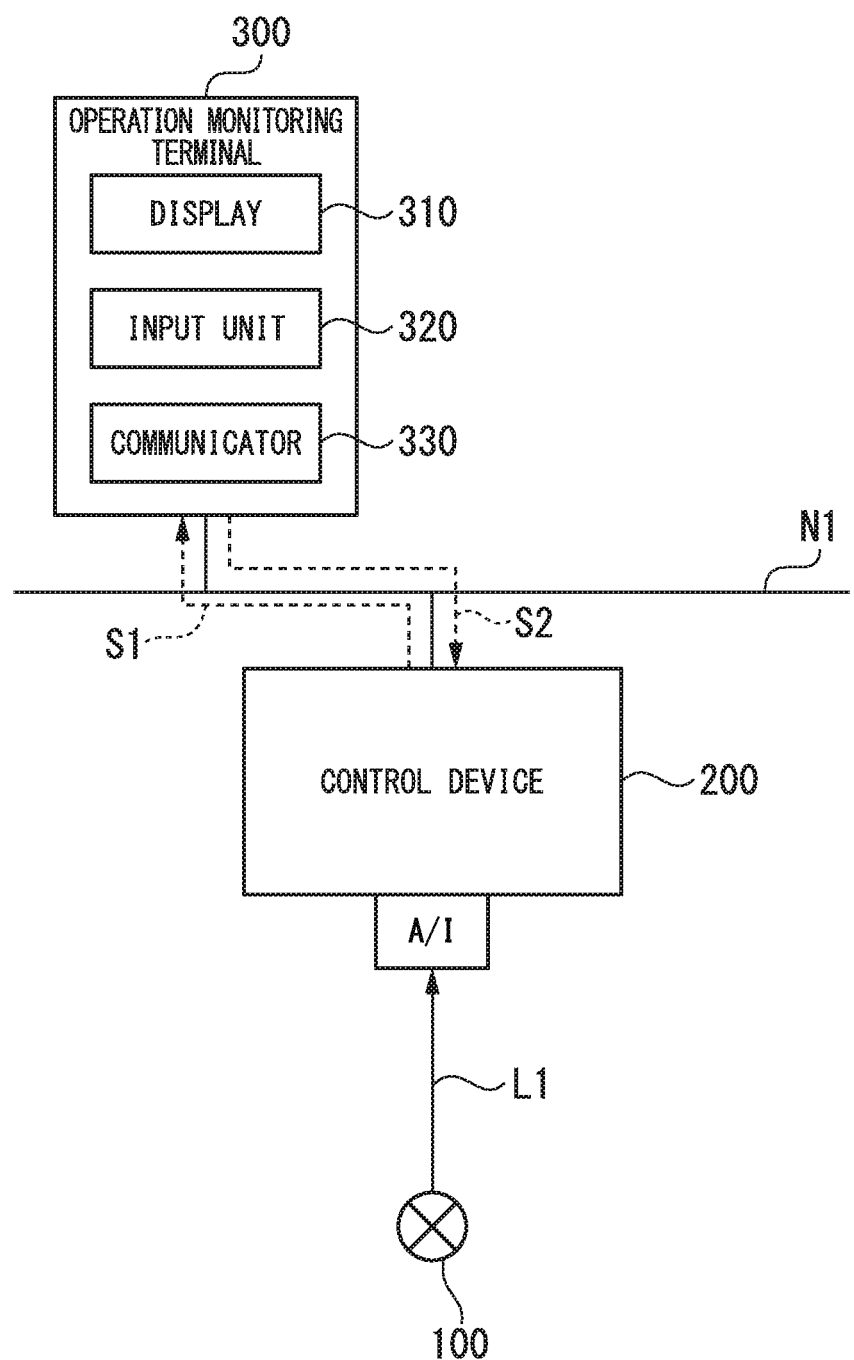
FIG. 2 is a block diagram illustrating operation of the control device 200 and the operation monitoring terminal 300.

FIG. 2 is a block diagram illustrating operation of the control device 200 and the operation monitoring terminal 300. Hereinafter, a FGS (Fire and Gas System) will be described as an example of a safety instrumented system.

The FGS is a system established in order to prevent expansion of an accident which occurs in the plant. For example, the field device 100 used for establishing the FGS is a gas detector, a flame detector, a heat detector, and a smoke detector. If an abnormality (smoke, flame, or the like) occurs in the plant, a measurement value of the field device 100 becomes a value (alarm value) which exceeds a predetermined threshold value. Once the measurement value exceeds the threshold value, even if the measurement value is converged to less than the threshold value, the field device 100 continues to output the alarm value. This is for certainly notifying the abnormality which has occurred in the plant.

As shown in FIG. 2, the field device 100 is connected to the control device 200 through the line L1. The control device 200 receives the alarm value output from the field device 100. Thereafter, the control device 200 transmits, to the operation monitoring terminal 300, an alarm signal S1 representing that an abnormality has been detected in the field device 100.

The operation monitoring terminal 300 is equipped with a display 310, an input unit 320, and a communicator 330. The display 310 is a display device such as a liquid crystal display. The input unit 320 is an input device such as a keyboard and a mouse. The communicator 330 communicates with the control device 200 through the intranet N1.

Even if the abnormality factor is resolved, the field device 100 continues to output an alarm value. In order to release the alarm status of the field device 100, it is necessary to reset the field device 100 (power-off and power-on). This is because it is necessary to release the alarm status under the plant operator's intention after the abnormality factor has been resolved and a safety has been confirmed. As an operation method for resetting the field device 100, there are a case where two operations (power-off operation and power-on operation) are performed and a case where power-off and power-on are performed by one operation. This is dependent on an application built in the control device 200.

If the communicator 330 receives the alarm signal S1 from the control device 200, the display 310 displays contents of the alarm. Thereby, the plant operator can understand a place where the abnormality has occurred in the plant and contents of the abnormality, and can perform countermeasures for resolving the abnormality factor.

If the plant operator confirms that the abnormality factor which is a cause of the alarm has been resolved, the plant operator inputs instructions for resetting the field device 100 by using the input unit 320 of the operation monitoring terminal 300. In accordance with the instructions, the communicator 330 transmits reset instructions S2 to the control device 200. Thus, the reset instructions for the field device 100 can be transmitted from the operation monitoring terminal 300. Thereby, even if a lot of field devices 100 are installed in the plant, efficiency of the plant operator's work can be improved.

Figure 3:
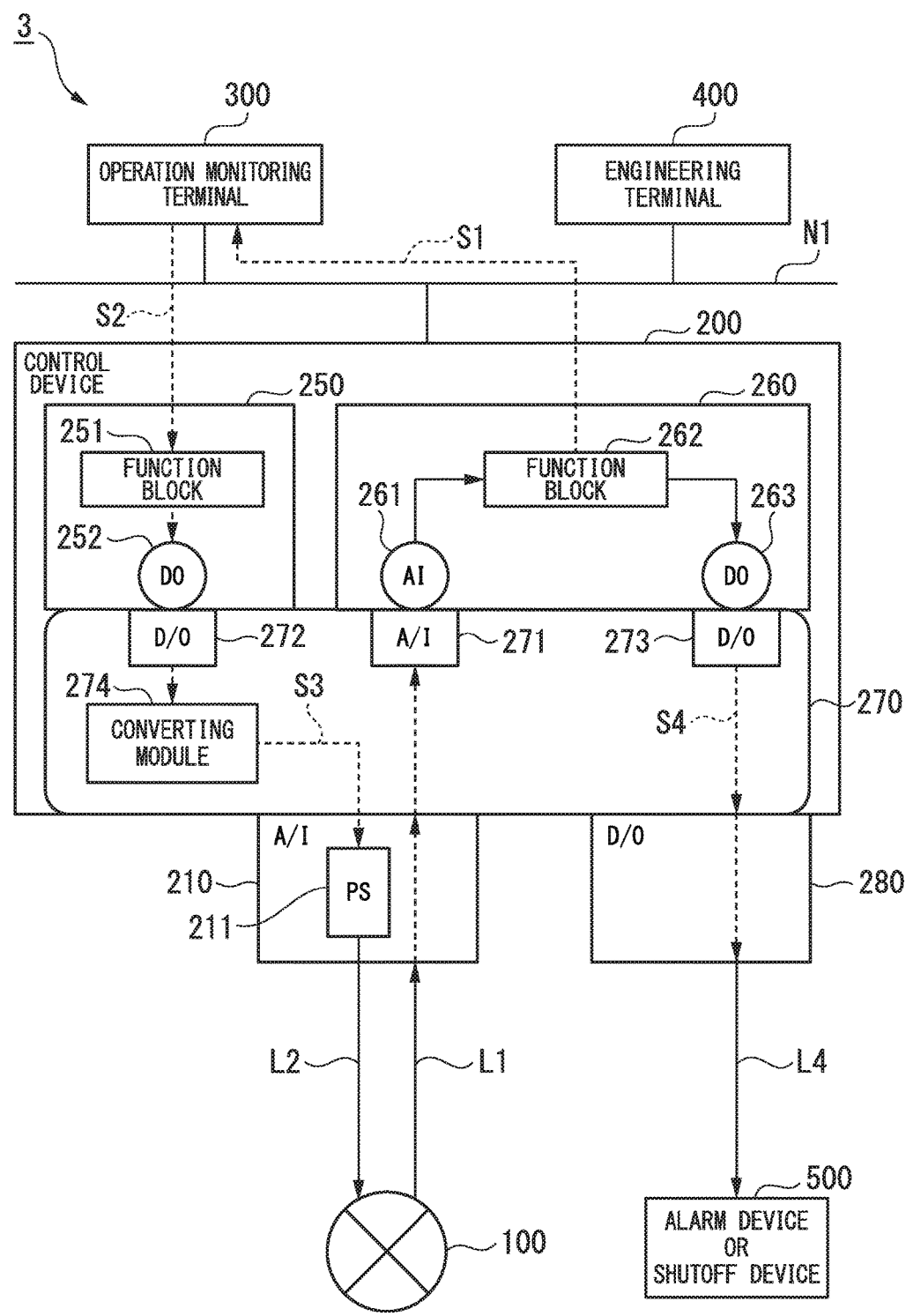
FIG. 3 is a block diagram illustrating a processing performed in the control device 200.

FIG. 3 is a block diagram illustrating a processing performed in the control device 200. The control device 200 is equipped with an A/I module 210, application logic (reset logic 250 and safety logic 260), a software module 270, and a D/O module 280.

The lines L1 and L2 are arranged in a pair. The A/I module 210 is an interface module which receives a measurement value (analog input signal) from the field device 100 through the line L1. The A/I module 210 includes a power supply unit 211 which outputs a direct current signal for supplying electric power to the field device 100 through the line L2. An operation signal for operating the field device 100 is overlapped on the direct current signal output through the line L2.

The converter 202 selects and performs the software module 270 which performs D/O to A/I conversion, out of a software module library where two or more software modules are contained. The software module library is stored in the storage 203 shown in FIG. 1. A plurality of software modules which convert to other formats is contained in the software module library, in addition to the software module 270 which performs D/O to A/I conversion.

The A/I module 210 outputs the measurement value, which has been received from the field device 100, to the software module 270. The software module 270 includes a virtual A/I terminal 271, a virtual D/O terminal 272, a virtual D/O terminal 273, and a converting module 274. The virtual A/I terminal 271, the virtual D/O terminal 272, and the virtual D/O terminal 273 are virtual terminals implemented by software. The virtual A/I terminal 271 outputs the measurement value, which has been output from the A/I module 210, to the safety logic 260.

The safety logic 260 is one of application logics performed by the application executer 201. The safety logic 260 is stored in the storage 203 shown in FIG. 1. The application executer 201 reads the safety logic 260 out of the storage 203 and performs the safety logic 260. The safety logic 260 includes a virtual A/I terminal 261, a function block 262, and a virtual D/O terminal 263. The virtual A/I terminal 261 and the virtual D/O terminal 263 are virtual terminals implemented by software. The measurement value, which has been output from the virtual A/I terminal 271 of the software module 270, is input into the virtual A/I terminal 261.

The function block 262 of the safety logic 260 transmits the measurement value, which has been input into the virtual A/I terminal 261, to the operation monitoring terminal 300 through the intranet N1. If the operation monitoring terminal 300 has received the measurement value of the field device 100, the operation monitoring terminal 300 displays the measurement value (process value) on the display 310 shown in FIG. 2. Thereby, the plant operator can understand a state of each field device 100 in the plant.

If an alarm value is transmitted from the field device 100, the function block 262 transmits the alarm signal S1 to the operation monitoring terminal 300. If the operation monitoring terminal 300 has received the alarm signal S1, the operation monitoring terminal 300 displays contents of the alarm on the display 310.

If the plant operator confirms that the abnormality factor which is a cause of the alarm has been resolved, the plant operator inputs instructions for resetting the field device 100 by using the input unit 320 of the operation monitoring terminal 300. In accordance with the instructions, the communicator 330 transmits reset instructions S2 to the control device 200.

The reset logic 250 is one of application logics performed by the application executer 201. The reset logic 250 is stored in the storage 203 shown in FIG. 1. The application executer 201 reads the reset logic 250 out of the storage 203 and performs the reset logic 250. The reset logic 250, the safety logic 260, and the software module 270 may be stored in separate storage units respectively. The reset logic 250 includes a function block 251 and a virtual D/O terminal 252. The virtual D/O terminal 252 is a virtual terminal implemented by software.

If the function block 251 of the reset logic 250 has received the reset instructions S2 from the operation monitoring terminal 300, the function block 251 generates a reset signal for turning off and turning on a power source of the field device 100. The virtual D/O terminal 252 outputs, to the software module 270, the reset signal (digital output signal) which has been generated by the function block 251.

The reset signal, which has been output from the virtual D/O terminal 252 of the reset logic 250, is input into the virtual D/O terminal 272 of the software module 270. The converting module 274 converts the reset signal, which has been input into the virtual D/O terminal 272, into a format which is suitable for the A/I module 210. That is, the converting module 274 performs D/O to A/I conversion with respect to the reset signal which has been input into the virtual D/O terminal 272. The converting module 274 outputs the converted reset signal S3 to the A/I module 210.

Figure 4:
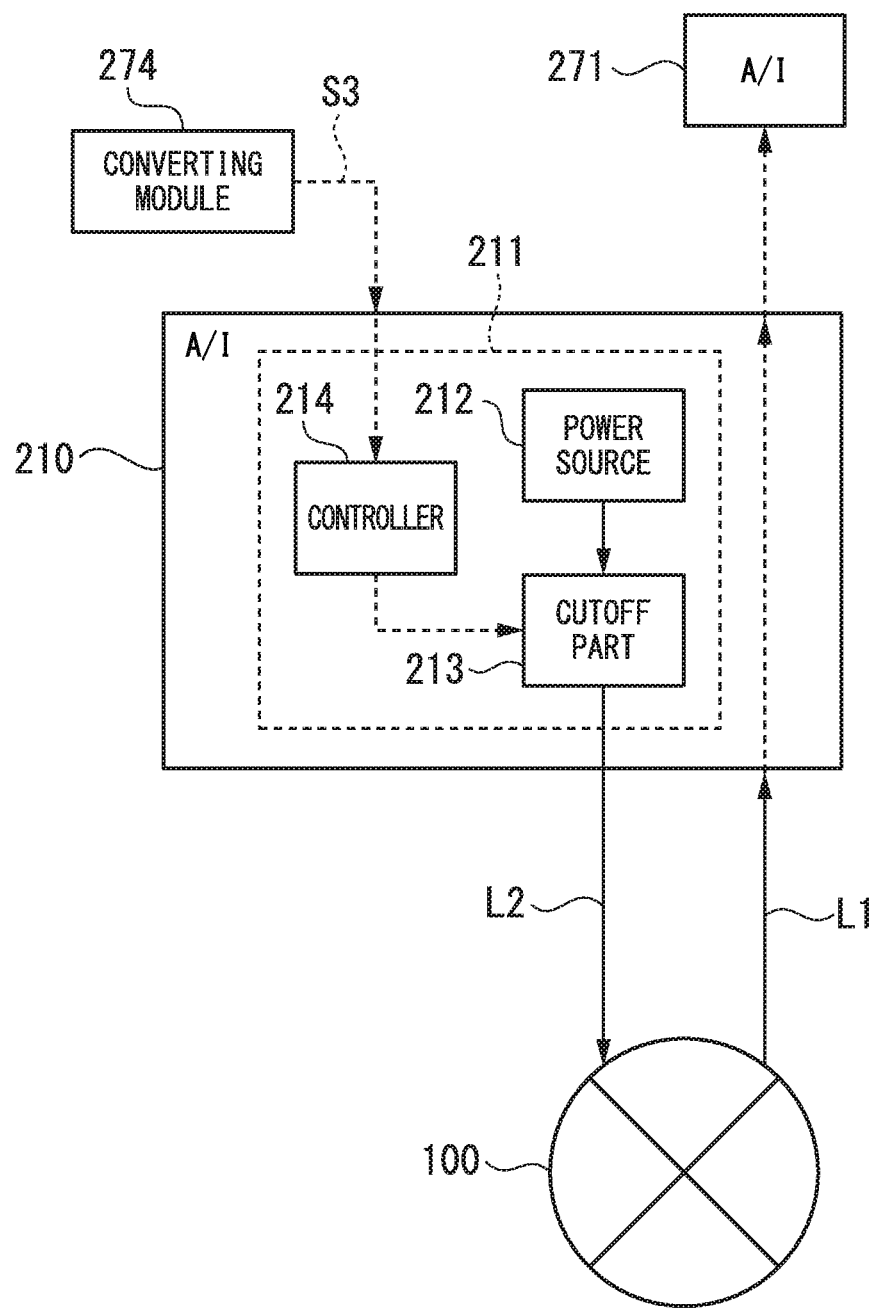
FIG. 4 is a block diagram illustrating a detailed configuration of the A/I module 210.

FIG. 4 is a block diagram illustrating a detailed configuration of the A/I module 210. A power supply unit 211 of the A/I module 210 includes a power source 212, the cutoff part 213, and the controller 214. The power source 212 supplies electric power to the field device 100. The cutoff part 213 is a switch which cuts off the electric power supplied from the power source 212 to the field device 100. The controller 214 transmits an operation signal to the field device 100, and performs ON/OFF control of the cutoff part 213.

If the reset signal S3 which has been output from the converting module 274 is input into the controller 214, the controller 214 turns off the switch of the cutoff part 213 in order to cut off the electric power supplied from the power source 212 to the field device 100. After the power source of the field device 100 was turned off, the controller 214 turns on the switch of the cutoff part 213 in order to restart to supply electric power from the power source 212 to the field device 100. Thereby, the field device 100 can be reset, and the alarm status can be released.

On the other hand if the measurement value of the field device 100 input into the virtual A/I terminal 261 represents an abnormal value, the function block 262 of the safety logic 260 generates a driving signal for driving an alarm device or a shutoff device 500. For example, the case where the measurement value of the field device 100 represents an abnormal value is a case where the measurement value of the field device 100 exceeds a predetermined threshold value.

The virtual D/O terminal 263 outputs the driving signal (digital output signal), which has been generated by the function block 262, to the software module 270.

The driving signal, which has been output from the virtual D/O terminal 263 of the safety logic 260, is input into the virtual D/O terminal 273 of the software module 270. The software module 270 outputs the driving signal S4, which has been input into the virtual D/O terminal 273, to the D/O module 280. The D/O module 280 transmits the driving signal S4, which has been output from the software module 270, to the alarm device or the shutoff device 500 through the line L4. The alarm device 500 is a device for notifying an abnormality by using a siren or a red light. The shutoff device 500 is a device for stopping a process forcibly, such as a shutter.

If the measurement value of the field device 100 represents an abnormal value, flame, smoke, or the like has occurred around the field device 100. Therefore, the alarm device 500 sounds a siren or turns on a red light in accordance with the driving signal which has been received from the D/O module 280. Thereby, danger can be notified to a worker in the plant. The shutoff device 500 closes a shutter installed in the plant in accordance with the driving signal which has been received from the D/O module 280. Thereby, flame, smoke, or the like can be prevented from spreading in the plant. In addition, the alarm device or the shutoff device 500 may cut off electric power of each device in the plant forcibly, and may drive a sprinkler in order to extinguish the fire. Thereby, the damage in the plant can be avoided from expanding.

Figure 5:
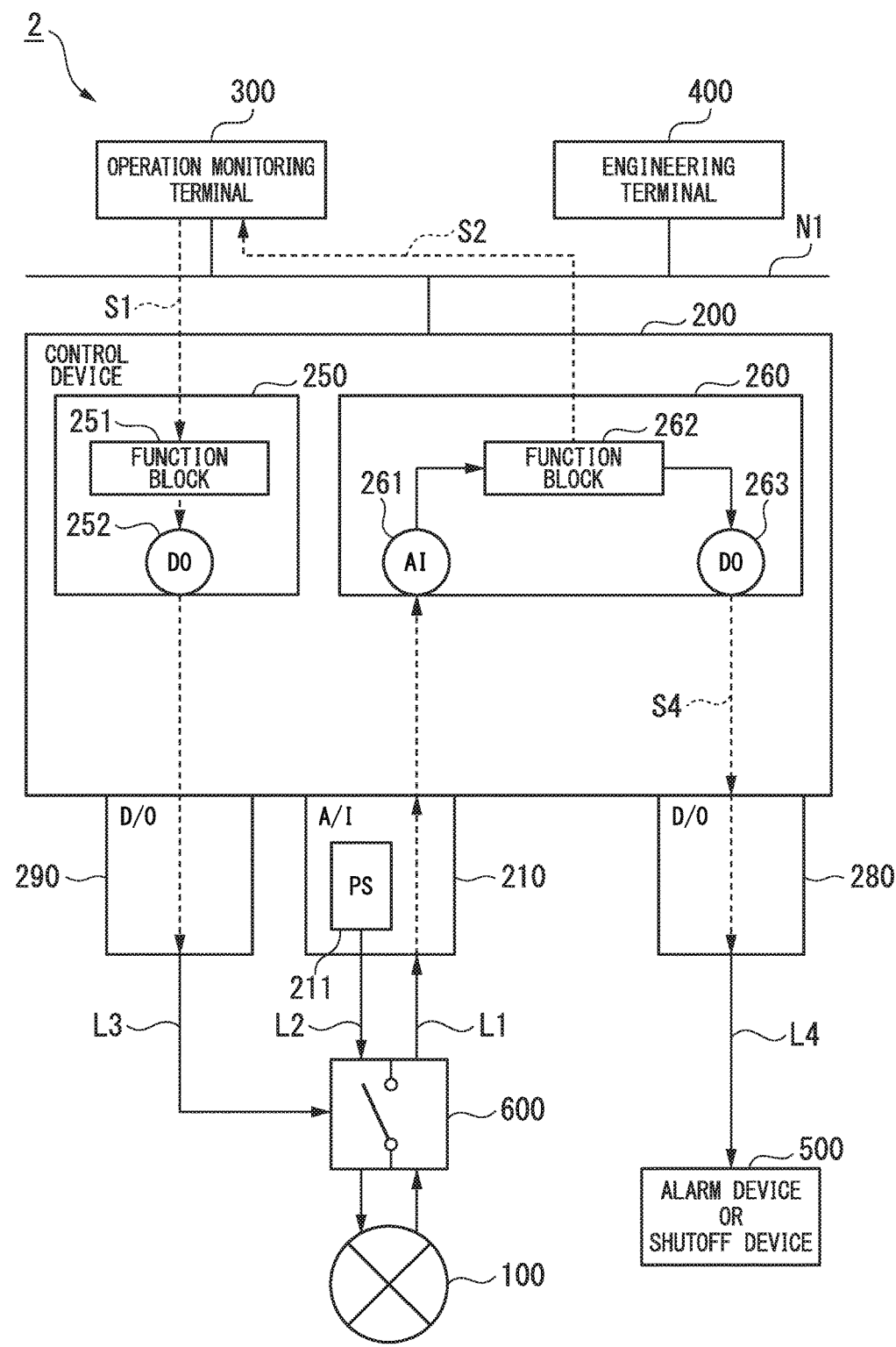
FIG. 5 is a block diagram illustrating a whole configuration of a process control system 2 which is a comparison example.

FIG. 5 is a block diagram illustrating a whole configuration of a process control system 2 which is a comparison example. A difference between the process control system 1 of the present embodiment and the process control system 2 of the comparison example, and a superiority of the process control system 1 of the present embodiment will be described by using FIG. 5.

As shown in FIG. 5, in the process control system 2 of the comparison example, a relay 600 is prepared between the A/I module 210 and the field device 100, and a D/O module 290 is prepared between the reset logic 250 and the relay 600. The software module 270 shown in FIG. 3 does not exist in the process control system 2 of the comparison example.

In the process control system 2 of the comparison example, the reset logic 250 outputs, from the virtual D/O terminal 252, the reset signal for cutting off the electric power supplied from the power supply unit 211 to the field device 100. The reset signal output from the virtual D/O terminal 252 is a signal of which format is suitable for the D/O module 290.

The D/O module 290 transmits a power-off signal to the relay 600 through the line L3 based on the reset signal output from the virtual D/O terminal 252. The relay 600 cuts off the communication and the power supply in the line L1 and the line L2 in accordance with the power-off signal received from the D/O module 290. After the power supply to the field device 100 was turned off, the D/O module 290 transmits a power-on signal to the relay 600 through the line L3. The relay 600 restarts the communication and the power supply in the line L1 and the line L2 in accordance with the power-on signal received from the D/O module 290. Thereby, the reset operation is completed.

In comparison with the process control system 2 of the comparison example, since the process control system 1 of the present embodiment does not need the relay 600, the D/O module 290, and the line L3, manufacturing costs can be reduced.

In the process control system 2 of the comparison example, if hardware configuration is changed, it is necessary to greatly change the program (reset logic 250) which runs on the control device 200. However, since high reliability and high maintainability are required for the reset logic 250, it is not preferable that the proven reset logic 250 is changed greatly.

On the other hand, the process control system 1 of the present embodiment includes the converter 202 which converts the signal, which has been output from the reset logic 250, into a format which is suitable for the A/I module 210. Thereby, hardware configuration can be changed without changing the reset logic 250 greatly.

In the system of the comparison example, reset instructions are output as a process output to the field device 100. On the other hand, in the present embodiment, in order to reduce costs of hardware, the reset instructions are output to the A/I module 210 so that the A/I module 210 can directly switch the internal electric supply.

That is, in the present embodiment, the reset instructions are not output to the field device 100 as a process output, but the reset instructions are output to a part of system (A/I module 210). In the present embodiment, although an output destination of the reset instructions is changed in accordance with the change of hardware, the proved application logic (reset logic 250 and safety logic 260) of the conventional system can be diverted as much as possible, and the reset instructions to the system can be performed as a process output which is the same as the comparison example.

In the reset logic 250 and the safety logic 260, it is required that input and output are separated clearly from viewpoints of visibility and maintainability. In the present embodiment, the input signal (the measurement value of the field device 100) to the safety logic 260 is input into the virtual A/I terminal 261, and the output signal (reset signal) from the reset logic 250 is output from the virtual D/O terminal 252.

On the other hand, in the configuration of FIG. 3, if the software module 270 does not exist, since the D/O module 290 does not exist, both the virtual A/I terminal 261 and the virtual D/O terminal 252 are connected to the A/I module 210. Therefore, input and output are performed with respect to the A/I module 210. In order to improve visibility and maintainability, it is easy-to-understand and desirable that each of the input terminals and the output terminals in the reset logic 250 and the safety logic 260 have a single function/meaning to become one-to-one. However, the input/output allocation to the A/I module 210 is contrary to this.

Therefore, in the present embodiment, the virtual D/O terminal 252 of the reset logic 250 is connected to the virtual D/O terminal 272 of the software module 270. The converting module 274 performs D/O to A/I conversion with respect to the signal input into the virtual D/O terminal 272. Thereby, an input/output separation rule about AI input and DO output can be followed strictly in the reset logic 250 and the safety logic 260, and input/output can be performed with respect to the A/I module 210 in actual hardware.

Figure 6:
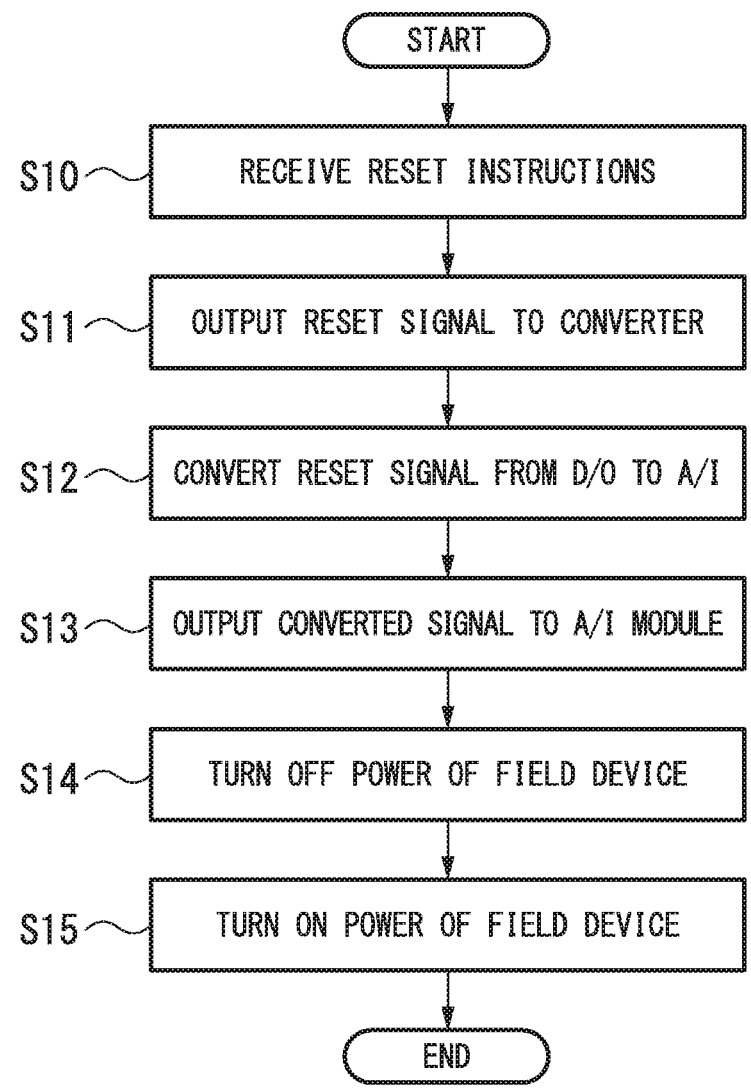
FIG. 6 is a flow chart illustrating a processing of the control device 200.

FIG. 6 is a flow chart illustrating a processing of the control device 200. If the application executer 201 has received the reset instructions S2 transmitted from the operation monitoring terminal 300 (Step S10), the application executer 201 outputs, to the converter 202, the reset signal for turning off and turning on the power source of the field device 100 (Step S11). Specifically, the application executer 201 generates the reset signal by using the function block 251, and outputs the generated reset signal from the virtual D/O terminal 252 to the software module 270.

Next, the converter 202 performs D/O to A/I conversion with respect to the reset signal output from the application executer 201 (Step S12). Specifically, the converter 202 performs D/O to A/I conversion with respect to the reset signal input into the virtual D/O terminal 272 by using the converting module 274.

Next, the converter 202 outputs the converted reset signal to the A/I module 210 (Step S13). The A/I module 210 turns off the power source of the field device 100 based on the reset signal output from the converter 202 (Step S14). Specifically, the controller 214 prepared in the A/I module 210 turns off the switch of the cutoff part 213 in order to cut off the power supply from the power source 212 to the field device 100.

After the power source of the field device 100 was turned off, the controller 214 turns on the power source of the field device 100 (Step S15). Specifically, the controller 214 turns on the switch of the cutoff part 213 in order to restart to supply electric power from the power source 212 to the field device 100 and transmit the operation signal from the controller 214 to the field device 100. Thereby, the field device 100 can be reset and the alarm status can be released.

As described above, the control device 200 of the present embodiment includes the converter 202 which converts the reset signal output from the application executer 201 into a format which is suitable for the A/I module 210. Thereby, an improvement effect by a change of hardware can be achieved without changing application logic greatly.

Although the converting module 274 converts the signal, which has been output from the reset logic 250, into a format which is suitable for the A/I module 210 and outputs the converted signal, it is not limited thereto. For example, the converting module 274 may convert the signal, which has been input from one or more interface modules (for example, A/I module 210), into a format which is suitable for the application logic (for example, the reset logic 250 or the safety logic 260), and may output the converted signal.

Thus, the software module 270 of the present embodiment includes the converting module 274. The converting module 274 converts the signal, which has been output from the application logic (for example, the reset logic 250 or the safety logic 260), into a format which is suitable for an interface module (for example, the A/I module 210), and outputs the converted signal, and/or the converting module 274 converts the signal, which has been input from the interface module, into a format which is suitable for the application logic. Thereby, an improvement effect by a change of hardware can be achieved without changing application logic greatly.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A control device comprising:
   an interface module configured to supply electric power to a field device installed in a plant;
   an application executer configured to output a reset signal for resetting the field device; and
   a converter configured to convert the reset signal, which has been output from the application executer, into a format which is suitable for the interface module,
   wherein the application executer is configured to execute reset logic which comprises a first virtual terminal for outputting the reset signal,
   wherein the converter is configured to execute a software module, and
   wherein the software module comprises:
      a second virtual terminal into which the reset signal, which has been output from the first virtual terminal, is input; and
      a converting module configured to convert the reset signal, which has been input into the second virtual terminal, into the format which is suitable for the interface module.

2. The control device according to claim 1,
   wherein the interface module comprises:
      a power source configured to supply electric power to the field device; and
      a cutoff part configured to cut off the electric power supplied from the power source to the field device based on the reset signal converted by the converter.

3. The control device according to claim 1,
   wherein the interface module is configured to output a measurement value, which has been received from the field device, to the software module, and
   wherein the software module comprises a third virtual terminal which is configured to output the measurement value output from the interface module.

4. The control device according to claim 3,
   wherein the application executer is configured to execute safety logic,
   wherein the safety logic comprises:
      a fourth virtual terminal into which the measurement value, which has been output from the third virtual terminal, is input;
      a first function block configured to generate a driving signal for driving an alarm device or a shutoff device installed in the plant; and
      a fifth virtual terminal configured to output the driving signal generated by the first function block, and
   wherein the software module comprises:
      a sixth virtual terminal into which the driving signal, which has been output from the fifth virtual terminal, is input.

5. The control device according to claim 4,
   wherein the safety logic is configured to transmit the measurement value, which has been input into the fourth virtual terminal, to an operation monitoring terminal connected to the control device through a network.

6. The control device according to claim 5,
   wherein the reset logic further comprises a second function block which is configured to generate the reset signal if the reset logic has received reset instructions from the operation monitoring terminal.

7. The control device according to claim 4, further comprising:
   a second interface module configured to transmit the driving signal to the alarm device or the shutoff device,
   wherein the software module is configured to output the driving signal, which has been input into the sixth virtual terminal, to the second interface module.

8. A control method comprising:
   supplying, by an interface module, electric power to a field device installed in a plant;
   outputting, by an application executer, a reset signal for resetting the field device;
   converting, by a converter, the reset signal, which has been output from the application executer, into a format which is suitable for the interface module;
   executing, by the application executer, reset logic which comprises a first virtual terminal for outputting the reset signal, and
   executing, by the converter, a software module which comprises a second virtual terminal and a converting module,
   wherein the reset signal, which has been output from the first virtual terminal, is input into the second virtual terminal, and
   wherein the converting module configured to convert the reset signal, which has been input into the second virtual terminal, into the format which is suitable for the interface module.

9. The control method according to claim 8, further comprising:
   supplying, by a power source, electric power to the field device, the power source being prepared in the interface module; and
   cutting off, by a cutoff part, the electric power supplied from the power source to the field device based on the reset signal converted by the converter, the cutoff part being prepared in the interface module.

10. The control method according to claim 8, further comprising:
    outputting, by the interface module, a measurement value, which has been received from the field device, to the software module,
    wherein the software module comprises a third virtual terminal which is configured to output the measurement value output from the interface module.

11. The control method according to claim 10, further comprising:
    executing safety logic by the application executer,
    wherein the safety logic comprises:
       a fourth virtual terminal into which the measurement value, which has been output from the third virtual terminal, is input;

a first function block configured to generate a driving signal for driving an alarm device or a shutoff device installed in the plant; and a fifth virtual terminal configured to output the driving signal generated by the first function block, and wherein the software module comprises:

a sixth virtual terminal into which the driving signal, which has been output from the fifth virtual terminal, is input.

12. The control method according to claim 11, further comprising:

transmitting, by the safety logic, the measurement value, which has been input into the fourth virtual terminal, to an operation monitoring terminal connected to the control device through a network.

13. The control method according to claim 12, wherein the reset logic further comprises a second function block which is configured to generate the reset signal if the reset logic has received reset instructions from the operation monitoring terminal.

14. The control method according to claim 11, further comprising:

transmitting, by a second interface module, the driving signal to the alarm device or the shutoff device, and outputting, by the software module, the driving signal, which has been input into the sixth virtual terminal, to the second interface module.

15. A control device comprising:

one or more interface module configured to output a signal to a field device installed in a plant, and/or into which a signal is input from the field device; and a software module comprising a converting module, the converting module being configured to convert the signal, which has been output from an application logic executed by an application executer, into a format which is suitable for the one or more interface module and output the converted signal, and/or the converting module being configured to convert the signal, which has been input from the one or more interface module, into a format which is suitable for the application logic, wherein the software module comprises:

one or more first virtual terminal into which the signal is input from the application logic; and one or more second virtual terminal into which the signal is input from the one or more interface module, wherein the application logic comprises a third virtual terminal which is configured to output the signal to the software module, and wherein the converting module is configured to convert the signal, which has been output from the third virtual terminal and input into the first virtual terminal, into the format which is suitable for the one or more interface module, or the converting module is configured to convert the signal, which has been output from the one or more interface module and input into the second virtual terminal, into the format which is suitable for the application logic.

16. The control device according to claim 15, wherein the application logic is configured to output a reset signal for resetting the field device to the converting module, wherein the converting module is configured to convert the reset signal, which has been output from the application logic, into the format which is suitable for the one or more interface module, and wherein the one or more interface module comprises:

a power source configured to supply electric power to the field device; and a cutoff part configured to cut off the electric power supplied from the power source to the field device based on the reset signal converted by the converter.

17. The control device according to claim 15, wherein the one or more interface module is configured to output a measurement value, which has been received from the field device, to the software module, wherein the software module is configured to output the measurement value, which has been output from the one or more interface module, to the application logic, and wherein the application logic is configured to generate a driving signal for driving an alarm device or a shutoff device installed in the plant based on the measurement value output from the software module.

* * * * *